United States Patent Office.

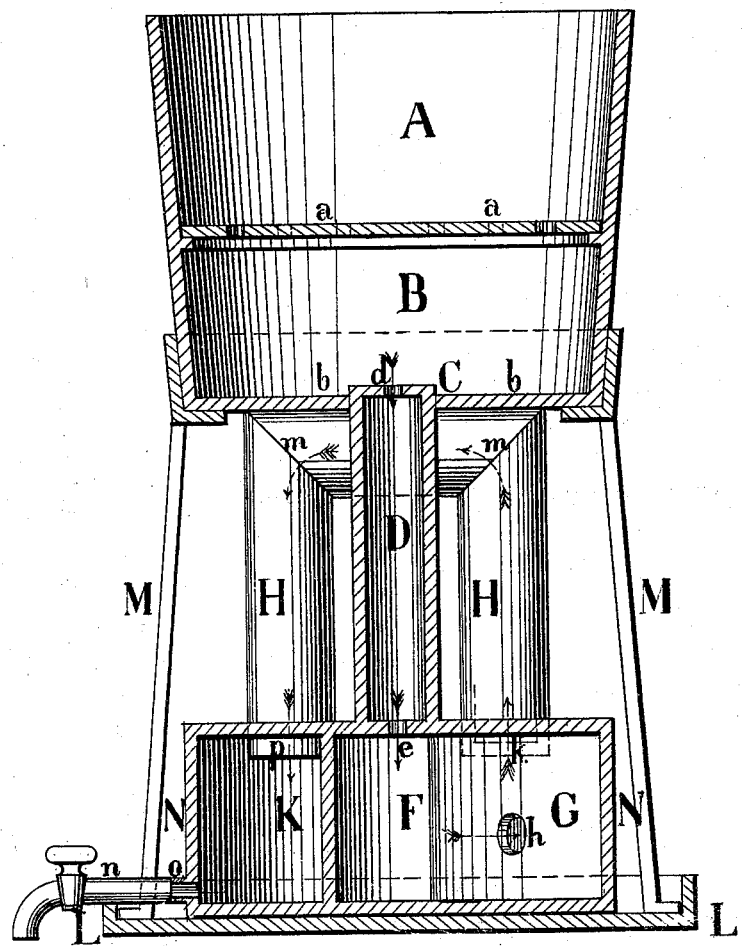
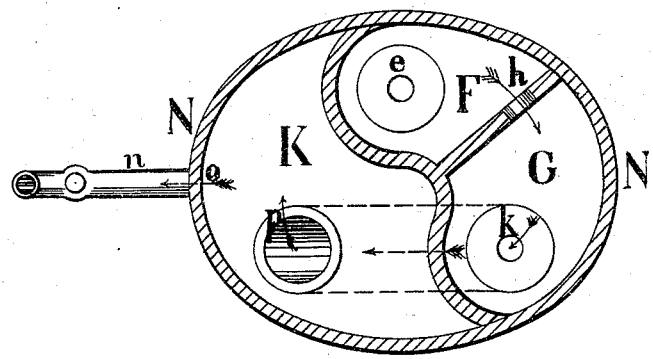

VICTOR KLOBASSA, OF WASHINGTON, DISTRICT OF COLUMBIA.

IMPROVEMENT IN WATER COOLERS AND FILTERS.

Specification forming part of Letters Patent No. 150,866, dated May 12, 1874; application filed April 8, 1874.

*To all whom it may concern:*

Be it known that I, VICTOR KLOBASSA, from Austria, now of the city of Washington, District of Columbia, have invented a new and useful Improvement in a Combined Filter and Cooler, for cooling water by evaporation through a prolongated channel of a porous vessel without the use of ice, and an easy adaptation of said cooler to any vessel whatever by cementing its connection, and regulating the flow of water by the contracted openings in the ends of pipes; also, offering facilities of changing, removing, and substituting its parts when occasion requires, and easily packed for transportation to camps or temporary tenements, or to climates where water is too hot, or muddy, or difficult of transit:

My invention consists of a reservoir or feeder (shown in drawing at letter A) for holding water intended to be filtered and cooled, and may be constructed as shown in drawing, or as a vase, jar, or barrel, made of japanned metal, glass, earthenware, clay, porcelain, wood, or any other suitable material, and of any shape or form and capacity, having two bottoms, *a* and *b*, made six, eight, or more inches apart, one above the other, according to size of reservoir and the capacity of the vessel, the upper bottom *a* made to fit closely the walls of the vessel A, and provided with a certain number of small holes or openings leading to chamber B or lower part of vessel A B. This chamber B is filled with regularly-laid stratums of gravel, sand, and coarsely-pulverized charcoal. The chamber B has an opening at C, into which pipe or conduit D is introduced and fixed by hydraulic cement, two to six inches, or more, in diameter, and one foot or more long, made of porous clay or earth, having in its upper end, at *d*, small holes to act as a sieve, which, during the service of the whole, must be surrounded with sponge. The other or lower end *e* of said pipe D presents an opening of much smaller size than the diameter of the pipes or conduits. The end *e* is connected with chamber F in the base. Then this chamber, by two small openings at *h*, is connected with chamber G in the same base, which chambers again are connected in K with a pipe, H H, bent round or square at *m m*, as the case may be. This pipe H H is almost double the length of the pipe D, and can run or be bent under the bottom *b b* of the vessel A B, and be fixed to the case by both its ends at *k* and *p*, thus forming a prolongated channel or conduit of water exposed to action of the porosity and of evaporation, and consequently to cooling, by the action of the atmospheric air and absorption of the caloric. The other end *p* of the pipe H H enters into the third chamber, K, in the base, which now is a magazine of cooled and filtered water designed for use, and carried through a faucet at O.

The pipes D and H H may be contracted or changed into an oval shape, forming one vessel of three compartments. The chambers joined—F, G, and K—form a base, N N, of the cooling-vessel, and is also made of porous clay, and rests on the tray-plate L L, which serves for the purpose of collecting the swelling drops of the oozing dew, to prevent the humidity and splashing around the stand, and fortifies the legs of the support M M, which are made of iron or other material, serving to hold the vessel A B, and thus diminishes pressure on the base N N.

What I claim, and desire to secure by Letters Patent, is—

1. The combination of the filter B, cooling vessels or pipes H H and D, and chambers K, F, and G, as and for the purpose set forth.

2. The combination of the chambers F, G, and K in the base vessel N N, and their communication with pipes H H and D, as described.

3. The process of cooling water by forcing the same through the porous pipes D into the chamber F, from the said chamber F to chamber G, and through the length of pipes H H, substantially as described.

In testimony that I claim the foregoing invention I have hereunto set my hand.

VICTOR KLOBASSA.

Witnesses:
C. F. McGILL,
J. TYLER POWELL.